Figure 1:
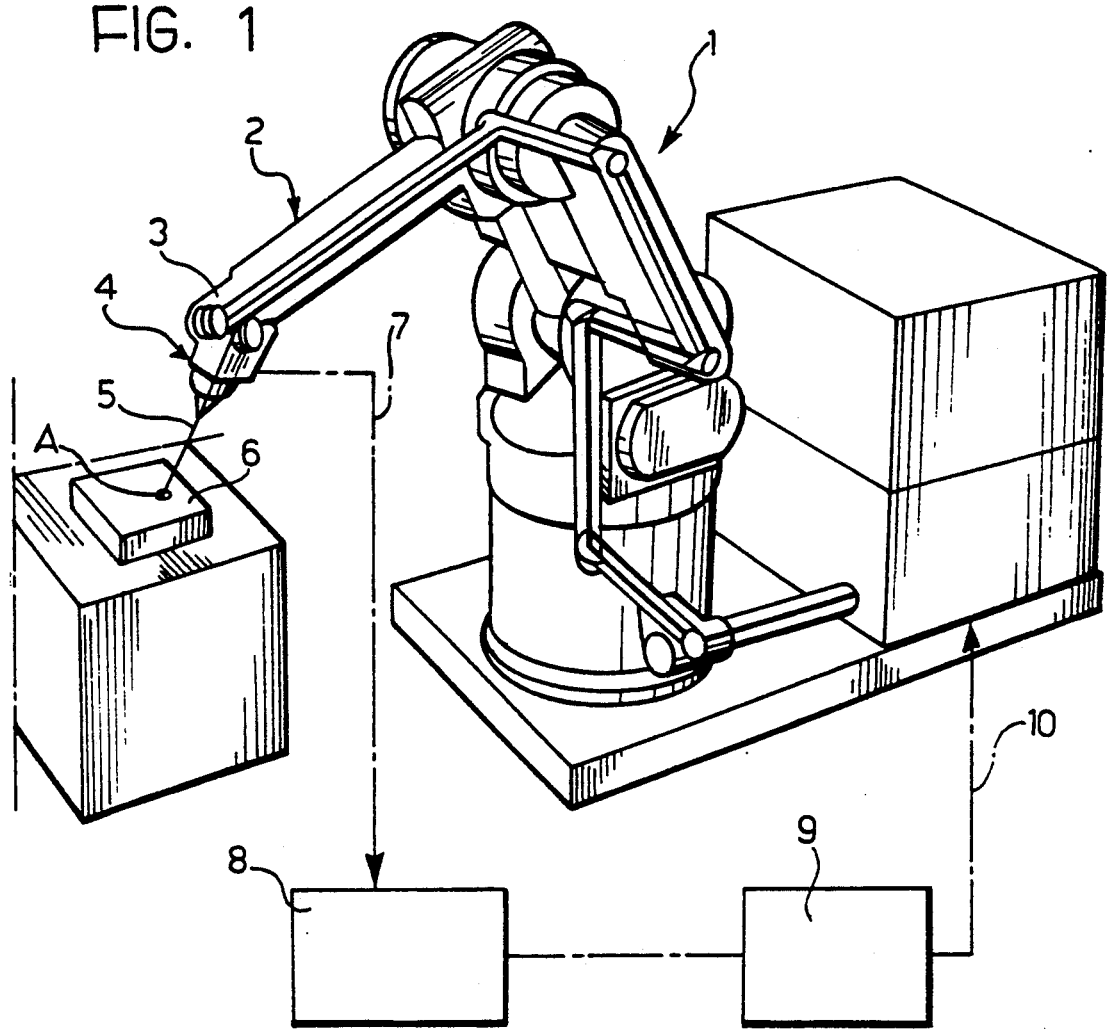

United States Patent [19]

Manassero et al.

[11] Patent Number: 5,314,248
[45] Date of Patent: May 24, 1994

[54] LASER DEVICE FOR SIMULTANEOUS INDUSTRIAL PROCESSING AND MONITORING OF TEMPERATURE

[75] Inventors: Giorgio Manassero, Orbassano; Alberto Maccagno, Beinasco, both of Italy

[73] Assignees: Comau S.p.A., Grugliasco; Consiglio Nazionale Delle Ricerche, Rome, both of Italy

[21] Appl. No.: 36,475

[22] Filed: Mar. 24, 1993

[30] Foreign Application Priority Data

Mar. 24, 1992 [IT] Italy .................. T092A000251

[51] Int. Cl.$^5$ ............................ G01J 1/00; G01J 5/00
[52] U.S. Cl. ................................ 374/124; 250/341; 901/46
[58] Field of Search ............... 374/130, 129, 161, 124; 250/341

[56] References Cited

U.S. PATENT DOCUMENTS

| | | | |
|---|---|---|---|
| 4,315,150 | 2/1982 | Darringer et al. | 374/130 X |
| 4,417,822 | 11/1983 | Stein et al. | 374/129 |
| 4,576,485 | 3/1986 | Lambert | 374/161 X |
| 4,840,496 | 6/1989 | Elleman et al. | 374/130 X |
| 4,859,075 | 8/1989 | Sutter et al. | 374/130 X |
| 4,866,362 | 9/1989 | Parker et al. | 901/46 X |
| 4,919,542 | 4/1990 | Nulman et al. | 374/126 X |
| 4,950,886 | 8/1990 | Claus et al. | 374/161 X |

FOREIGN PATENT DOCUMENTS

0309973B1 4/1989 European Pat. Off. .
63-058121 3/1988 Japan .

OTHER PUBLICATIONS

W. König, H. Willerscheid, Qualitätsprüfung beim Laserstrahlhärten anhand von Oberflächenkenngrössen (Quality Control of Laser-Hardened Tracks by Surface Parameters) Laser and Optoelektronik, vol. 23, No. 2, pp. 38-43, Apr. 1991 (Stuttgart, Germany).

*Primary Examiner*—Daniel M. Yasich
*Attorney, Agent, or Firm*—Edward D. Manzo

[57] ABSTRACT

A laser device which combines a device for focusing a laser beam onto a workpiece to carry out industrial processes, for example, surface hardening heat-treatment or welding, with a row of pyroelectric sensors to simultaneously monitor the temperature of a region of the workpiece being treated by detecting the thermal energy emitted by the workpiece. This detection of thermal energy occurs along an ideal line extending across a focal length of the region of the workpiece onto which the laser beam is focused. In the present invention, both the device for focusing the laser beam and the row of pyroelectric sensors are attached to a single head.

7 Claims, 3 Drawing Sheets

LASER DEVICE FOR SIMULTANEOUS INDUSTRIAL PROCESSING AND MONITORING OF TEMPERATURE

FIELD OF THE INVENTION

The present invention relates to systems for monitoring the quality of an industrial process such as, for example, a process for heat-treating or welding metal pieces by means of a laser beam.

PRIOR ART

The industrial use of lasers for carrying out processes of the type indicated above has now been known for some time. In particular, the use of lasers is known for heating pieces of steel or cast iron above a critical temperature and then allowing the pieces to cool rapidly so as to achieve surface hardening. The use of a laser beam with a fairly low power and a wide beam diameter or area in fact enables the surface of the piece to be heated without the metal being melted. The thin surface layer heated cools rapidly by thermal conduction after the beam has been directed elsewhere resulting in an increase, possibly a considerable increase, in surface hardness. This technique is used, for example, in the automotive industry in order to produce hardened surfaces with good wear resistance.

Naturally, particularly in the case of an automated production system, there is a need to monitor the quality of the process rapidly in order to perform any correcting operations during the process so as to maintain a constantly uniform quality. In the case of a surface-hardening heat treatment, the parameter to be monitored is the temperature of the heated surface, which is connected with the depth of hardening achieved.

European patent EP-B-0 309 973 describes a system for heat treatment by means of a laser beam which can be carried out either with a $CO_2$ laser or with an Nd:YAG laser, and in which the surface temperature of the piece being treated is monitored continuously during the execution of the process by means of a sensor, constituted by a pyroelectric sensor, for detecting the heat radiated from the piece.

Pyroelectric sensors have been known and used in the art for some time and can provide electrical signals which depend upon the thermal energy radiated towards them. They make use of the pyroelectric properties of some materials which assume a state of electrical polarization as a result of temperature changes.

However, the use of a single pyroelectric sensor for monitoring the surface temperature of the piece may be unsatisfactory as regards the reliability of the monitoring, since the sensor receives mainly the radiant energy coming from a certain point in the laser "spot" on the piece, that is the area of the piece which is illuminated by the laser beam. In fact, because of a series of factors, such as, for example, fluctuations in the power of the laser emitter and in its corresponding distribution, or any lack of uniformity of the covering layer which is applied to the piece in order to improve the absorption of the laser beam, the heating may not be uniform at the various points in the laser spot. There is therefore a risk that the monitoring of the temperature concentrated at one point in the spot may lead to a detected temperature value which is very different from the average value corresponding to the entire area.

Moreover, there is a need to provide systems for monitoring the temperature of the piece treated which are easy to fit and to use.

Naturally, the foregoing also applies to processes other than the surface treatment processes described above such as, for example, welding processes, in which the depth of the weld is linked to the temperature of the fused surface layer of material and with the quantity of laser energy actually absorbed.

OBJECT OF THE INVENTION

The object of the present invention is to provide a system for monitoring the thermal energy radiated from a piece undergoing laser treatment which enables quick and reliable monitoring of the temperature of the piece treated and which at the same time is easy to fit and to use.

THE INVENTION

In order to achieve this object, the subject of the invention is a laser device usable in an automated production system having an operating head with means for focusing a laser beam onto a piece to be subjected to an industrial process by means of a laser beam, the system also including pyroelectric sensor means for emitting signals indicative of the temperature of the piece in the region being treated and electronic means for processing the signals output by the sensor means, characterized in that:

the pyroelectric sensor means are fitted on the focusing head of the laser device, and the sensor means comprise a row of pyroelectric sensors for monitoring the temperature along an imaginary line extending across the area of the piece onto which the laser beam is focused.

The electronic processing means can process the signals and can provide a temperature signal corresponding to the average of the values detected.

In a typical application, there is a row of 8 pyroelectric sensors which thus prevent the inaccuracies of known systems resulting from the causes set out above.

Moreover, since the sensors are mounted on the focusing head, the system produced can be fitted quickly and easily and does not require the provision of a monitoring system independent of the laser device.

In a preferred embodiment, the device is a programmable laser robot, the wrist of which carries the focusing head having the row of pyroelectric sensors. The row of pyroelectric sensors forms part of a monitoring unit mounted on the robot head and including an optical system, an optical modulator or "chopper", and an optical filter, the unit being interposed in the path of the thermal radiation from the piece to the sensors.

According to a first possible embodiment, the focusing head has a selectively reflective mirror which is transparent as regards the wavelength of the laser beam but reflective as regards the wavelength of the thermal energy emitted by the piece towards the laser beam; the monitoring unit is arranged to receive the thermal radiation reflected by the selectively reflective mirror. In this solution, the sensors therefore detect the radiant energy emitted by the piece along the axis of the laser beam directed at the piece.

According to an alternative embodiment, the axis of the monitoring unit is inclined to the axis of the laser beam focused on the piece and intersects that axis in correspondence with the focal area.

Naturally, the system according to the invention may be applied to any industrial process which is carried out by means of a laser such as, for example, a heat-treatment process or a welding process.

Figure 2A:
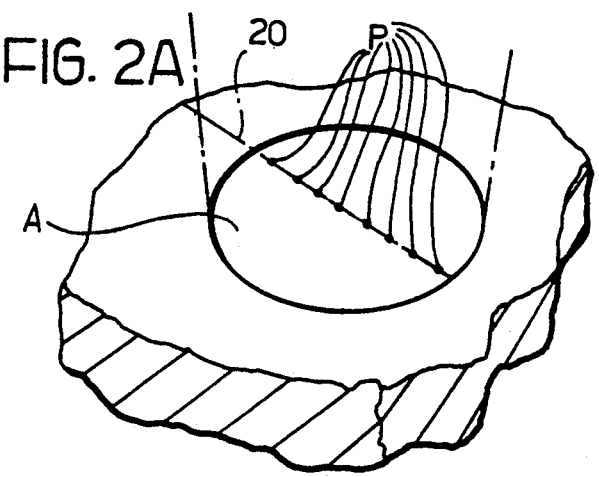
Figure 2:
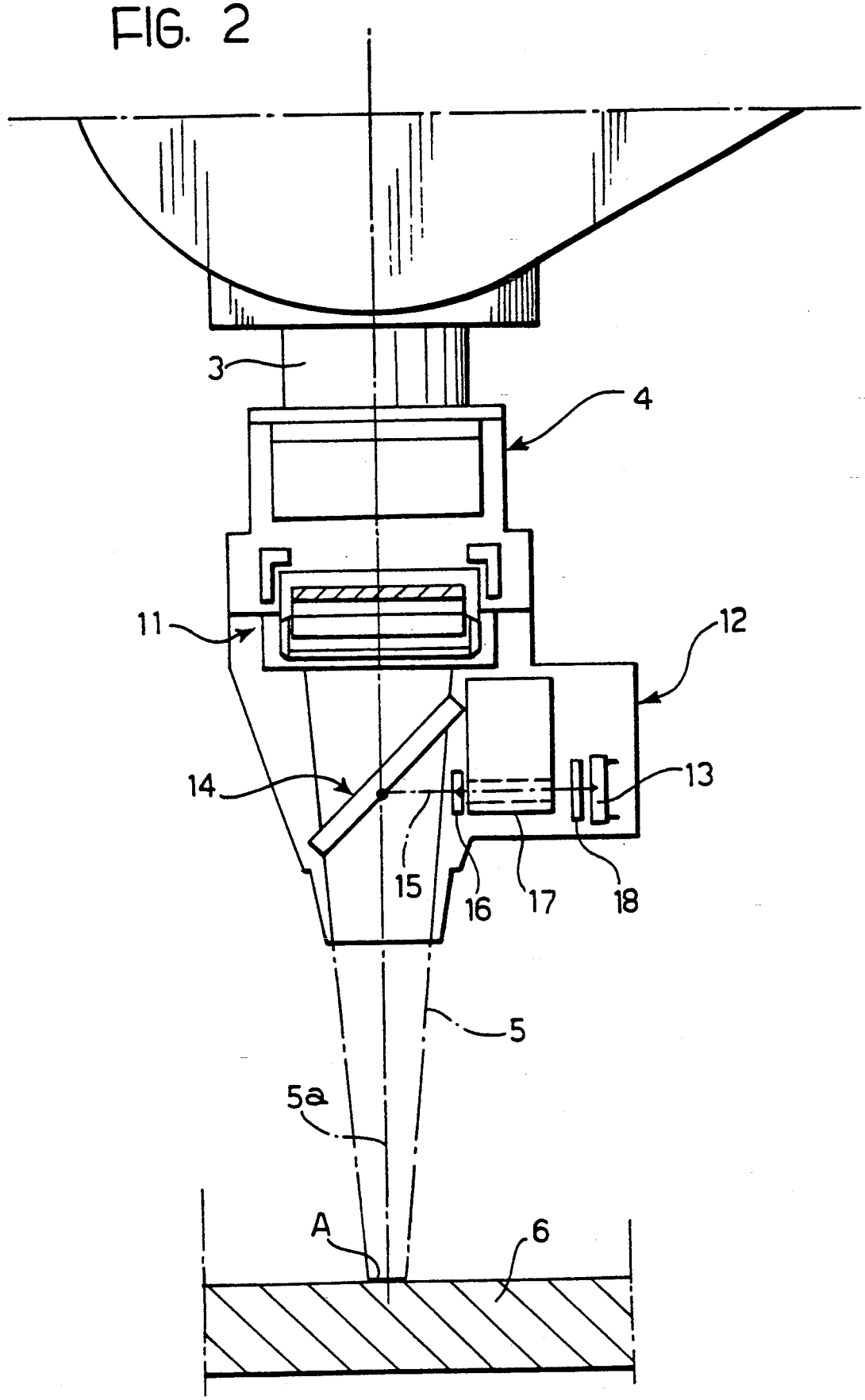
Figure 3:
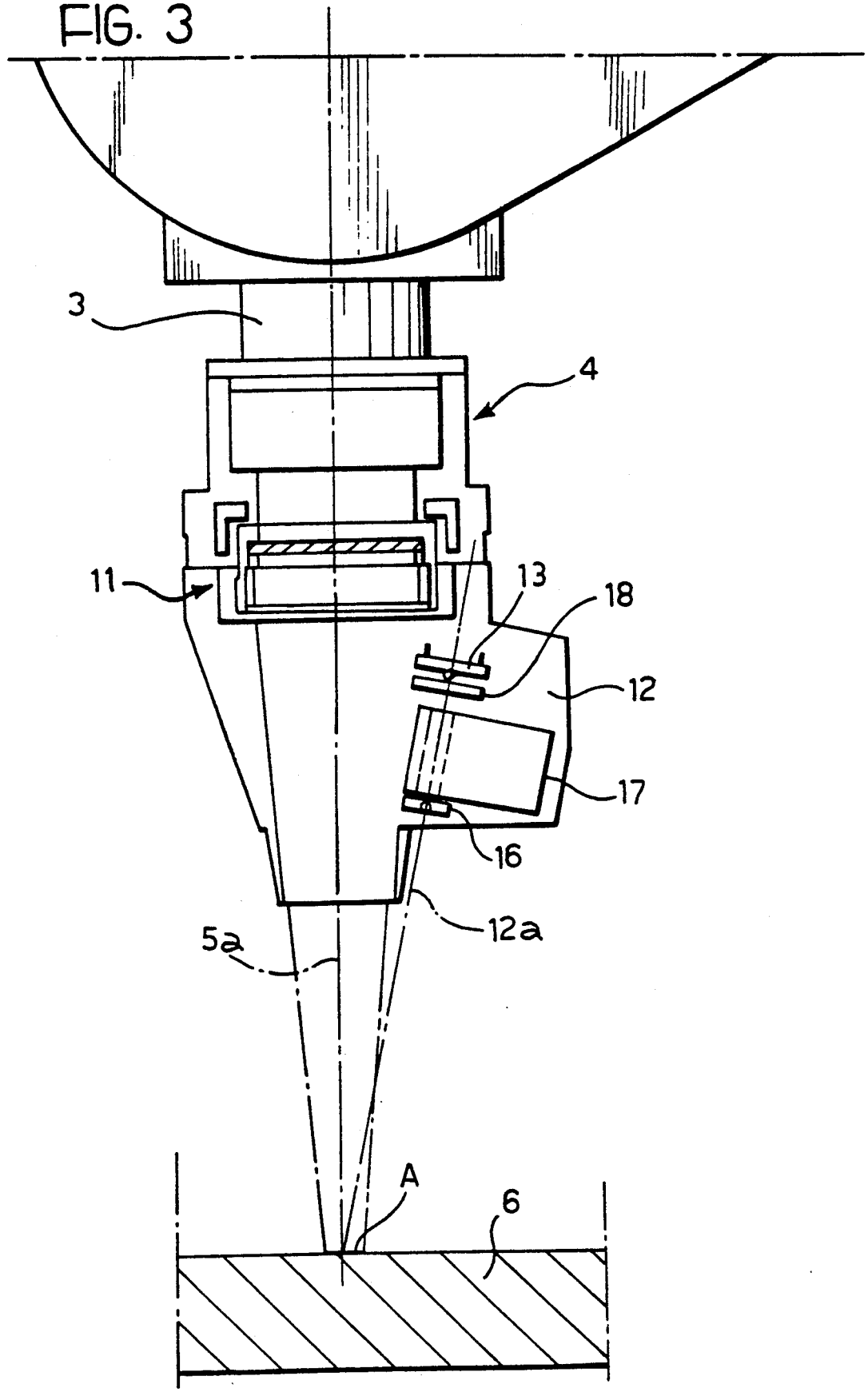

Further characteristics and advantages of the invention will become clear from the description which follows with reference to the appended drawings, provided purely by way of non-limiting example, in which:

FIG. 1 is a schematic perspective view of a laser robot having a focusing head according to the present invention, FIGS. 2 and 3 are schematic sections showing two possible embodiments of the focusing head, on an enlarged scale, and FIG. 2A shows the basic principle of the invention.

With reference to FIG. 1, a programmable laser robot of known type, generally indicated 1, includes a manipulator arm 2 terminating in a wrist 3 which carries a focusing head 4 for focusing a laser beam 5 onto a piece 6 which is to be subjected to an industrial process by means of a laser beam.

As will become clear from the following, sensor means mounted on the focusing head 4 can emit signals 7 indicative of the temperature of the piece in the area treated by the laser beam. The signal 7 is sent to electronic processing means 8 which act on a control device 9 for emitting a control signal 10 in order to alter the power of the laser beam emitted or its speed of movement when the temperature detected by the sensors indicates the need for intervention in order to keep the quality of the process constantly unchanged.

The details of the devices 8 and 9 are not shown since these devices may be formed in any known manner and, taken separately, do not fall within the scope of the present invention.

With reference to FIG. 2, the focusing head 4 includes an optical focusing system 11 of known type which focuses the laser beam 5 onto an area A on the surface of the piece 6. The area may, for example, be circular, with a diameter of the order of 10-20 mm, or square.

A casing 12 is also mounted on the focusing head and incorporates the monitoring unit according to the invention. This unit includes a row of pyroelectric sensors which can output electrical signals depending on the thermal radiation emitted along the axis 5a of the laser beam 5 from separate points in the area A. A selectively reflective mirror 14 mounted on the head is transparent as regards the wavelength of the laser beam but reflective as regards the wavelength of the thermal radiation emitted by the piece 6. This radiation is reflected along an axis 15 perpendicular to the axis 5a and is directed onto the row of sensors 13. A multi-lens optical system 16 formed by a plurality of lenses, an optical modulator or "chopper" 17, and optical filters 18 are interposed in the path of the radiation which is directed towards the sensors 13.

The pyroelectric sensors are of any known type and are not therefore described in detail in the present description. This also applies to the elements 16, 17 and 18. In particular, it is now conventional in this field to use an optical modulator or "chopper" which may be constituted, for example, by a wheel which has a ring of holes and is rotated so that transparent and opaque portions are successively brought into correspondence with the line of the thermal radiation in order to discriminate between the desired signal and interference signals. The optical filters may be selected to allow the passage of radiation only within a certain range of wavelengths, for example, wavelengths within a range of between 3 and 5 microns, or of between 8 and 14 microns.

With reference to FIG. 2A, the sensors 13 can detect the temperature at a series of points P aligned along a diameter 20 of the area A treated by the laser beam. The electronic processing means 8 are adapted to process the signals emitted by the pyroelectric sensors so as to provide, on the basis of the values of the signals from the individual sensors, an indication of the average temperature along the line 20 in the area A, this being indicative of the temperature in the area A.

FIG. 3 shows a variant in which the selectively reflective mirror 14 is not used and in which the axis 12a of the monitoring unit 12 intersects the axis 5a in correspondence with the area A of the surface of the piece 6.

Naturally, the principle of the invention remaining the same, the details of construction and forms of embodiment may be varied widely with respect to those described and illustrated purely by way of example. Thus, the system described above may naturally also be used to monitor a laser welding process in which, as well as monitoring the surface temperature, it is also possible to measure a fraction of the same reflected power for possible correlation with a rapid-response power detector.

What is claimed is;

1. A laser device for simultaneous monitoring of temperature and processing of a workpiece, the device comprising a focusing head, processing means fitted on the focusing head for focusing a laser beam onto the workpiece in order to carry out an industrial process, pyroelectric sensor means for detecting the thermal energy emitted by the workpiece in the region being processed and transmitting a signal corresponding to and indicative of the temperature of the workpiece in the region being processed, and electronic for processing the signal transmitted by the sensor means, wherein:

the pyroelectric sensor means is fitted on the focusing head of the laser device and includes a row of pyroelectric sensors which detect the thermal energy emitted by the workpiece in correspondence to a plurality of points which are located along an ideal line extending across a focal area of the workpiece onto which the laser beam is focused.

2. A laser device according to claim 1, wherein the device is constituted by a programmable laser- robot with a manipulator arm terminating in a wrist carrying the focusing head on which the row of pyroelectric sensors is mounted.

3. A device according to claim 1, wherein it has a monitoring unit which is mounted on the focusing head and carries the row of pyroelectric sensors, the monitoring unit including an optical system, an optical modulator or "chopper", and an optical filter interposed in the path of the thermal radiation directed from the piece towards the sensors.

4. A device according to claim 3, wherein the focusing head has a selectively reflective mirror which- is transparent as regards the wavelength of the laser beam but reflective as regards the wavelength of the thermal energy radiated from the piece towards the laser beam, and wherein the monitoring unit is arranged to receive the thermal radiation reflected by the selectively-reflective mirror.

5. A device according to claim 3, wherein the axis of the monitoring unit is inclined to the axis of the laser beam and intersects the latter in the focal area of the laser beam on the workpiece.

6. In a control method for an industrial process where a laser beam is directed onto a workpiece to carry on an industrial process, the control process including pyroelectric sensing to obtain signals indicative of the temperature of the workpiece in the region being treated by the laser beam, and processing the signals obtained from the pyroelectric sensing, the improvement wherein:

said pyroelectric sensing includes obtaining a plurality of signals from a corresponding plurality of pyroelectric sensors configured to detect the thermal energy emitted by the workpiece along a plurality of aligned spots within a focal area of the workpiece where the laser beam is directed; and electronically processing said plurality of signals.

7. The method of claim 6 wherein said step of obtaining a plurality of signals includes using a row of sensors on a focusing head for the laser beam and receiving signals from said plurality of sensors.

* * * * *